US00RE34862E

United States Patent [19]

Czor

[11] E Patent Number: Re. 34,862

[45] Reissued Date of Patent: Feb. 21, 1995

[54] ELECTRODEPOSITION PROCESS

[76] Inventor: Doug Czor, 10008 Caddie, N.W., Albuquerque, N. Mex. 87114

[21] Appl. No.: 60,212

[22] Filed: May 6, 1993

Related U.S. Patent Documents

Reissue of:

[64] Patent No.: 5,013,409
Issued: May 7, 1991
Appl. No.: 328,069
Filed: Mar. 23, 1989

[51] Int. Cl.[6] ..... C25D 1/10

[52] U.S. Cl. ..... 205/67; 264/227; 205/70; 205/72; 205/109

[58] Field of Search ..... 205/50, 67, 70, 72, 205/109; 264/227

[56] References Cited

U.S. PATENT DOCUMENTS

| | | | |
|---|---|---|---|
| 192,112 | 6/1877 | Closson . | |
| 218,473 | 8/1979 | Barrie . | |
| 267,816 | 11/1882 | Zalinski . | |
| 924,020 | 6/1909 | Walter . | |
| 2,632,722 | 3/1953 | Libberton . | |
| 2,846,377 | 8/1958 | Ross . | |
| 2,865,821 | 12/1958 | Jonke et al. . | |
| 3,424,635 | 1/1969 | Grandinetti et al. | 156/150 |
| 3,428,533 | 2/1969 | Pichel | 205/70 |
| 3,498,890 | 3/1970 | Divecha et al. | 204/3 |
| 3,616,300 | 10/1971 | Ahmad | 204/38 R |
| 3,649,474 | 3/1972 | Blakeslee et al. | 204/6 |
| 3,715,285 | 2/1973 | Tsuchiya et al. | 204/12 |
| 4,014,757 | 3/1977 | Frechin | 204/27 |
| 4,060,412 | 11/1977 | Divecha | 75/203 |
| 4,098,665 | 7/1978 | Frechin | 204/213 |
| 4,305,792 | 12/1981 | Kedward et al. | 206/16 |
| 4,339,311 | 7/1982 | Branik | 204/47 |
| 4,364,811 | 12/1982 | Fabian et al. | 204/220 |
| 4,422,919 | 12/1983 | Fabian et al. | 204/270 |
| 4,564,433 | 1/1986 | Werdecker et al. | 204/254 |
| 4,594,107 | 6/1986 | Wild et al. | 106/1.13 |
| 4,786,384 | 11/1988 | Gerhardt et al. | 204/149 |
| 4,830,668 | 5/1989 | Wundt et al. | 106/123 |
| 4,854,970 | 8/1989 | Wiech, Jr. | 106/286.1 |
| 4,876,868 | 10/1989 | Tushaus et al. | 72/42 |

*Primary Examiner*—John Niebling
*Assistant Examiner*—Arun S. Phasge
*Attorney, Agent, or Firm*—Deborah A. Peacock; Donovan F. Duggan

[57] ABSTRACT

The disclosure is directed to an electrodeposition process utilizing molds of original objects. The molds are placed, preferably horizontally, into the electrodeposition bath. The resulting product utilizes the mold-facing surface as the final surface of the product. The disclosure is also directed to a process for making molds useful for the electrodeposition process of the invention. The process is particularly useful for producing metal reproductions of original artworks.

62 Claims, No Drawings

ELECTRODEPOSITION PROCESS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an electrodeposition process and product using molds of objects. The invention is particularly useful for producing multiple, duplicate works of art.

2. Description of the Related Art

Electrodeposition or electroplating, in the prior art, involves the vertical plating onto or coating of an object. The object is placed into an electroplating bath, and metal from the anode and solution in the bath migrates to the object, thereby coating the object. The object may be the substrate for the electroplate or it may be removed; in any event, the outer coating (the plating layer furthest from the object) is the visual coating which is desired to be obtained. Prior art electroplating processes do not contemplate utilizing the inside coating layer (the plating surface or layer) which coats immediately onto the object, as the final or visual layer. Similarly, prior art plating processes do not contemplate plating molds in a horizontal position.

Metal sculpture is typically produced in the art by a lost-wax casting process where an original artwork is molded, the mold is filled with wax, plaster or ceramic is placed around the wax, the wax is burned out of the plaster or ceramic mold, molten metal is poured into the plaster or ceramic mold, and the mold is removed from the metal. This process is very time-consuming and expensive and requires substantial finishing of the final surface. Also, the molten metal has a viscosity which prevents the metal from fitting exactly into the mold configuration, thus causing the fine detail on the original artwork to be lost. Electroplated or electroformed artwork, in the prior art, involves using original substrates or objects to produce each product. Use of electrodeposition in combination with molds, as in the current invention, allows for making duplicate works of art having greater detail than castings, for a fraction of the cost and labor.

SUMMARY OF THE INVENTION

The invention provides a process for making a mold of an original object and electrodepositing a metal on the mold comprising the following steps:

a) obtaining an original solid object comprising a surface configuration which is to be essentially duplicated by the electrodeposition process;

b) applying a flexible molding material to the surface of the original object;

c) allowing the flexible molding material to cure or solidify to obtain a solid flexible mold comprising an object-facing surface configuration which is in a reverse configuration to the surface of the object, the flexible mold being essentially nonreactive to an electrodeposition solution;

d) removing the flexible mold from the surface of the original object;

e) providing conductive means to the object-facing surface of the mold;

f) placing the mold comprising the conductive means into an electrodeposition bath, the electrodeposition bath comprising the electrodeposition solution and at least one anode;

g) electrodepositing metal onto the object-facing surface of the mold for a sufficient time to form a metal deposit on the object-facing surface of the mold;

h) removing the mold from the electrodeposition bath; and i) detaching the mold from the metal deposit to produce an electrodeposited metal product comprising a mold-facing surface and a backing surface, the mold-facing surface having a substantially similar configuration to the surface of the original object.

The invention also provides a process for electrodepositing on an existing mold, using steps e) through i).

The flexible molding material preferably comprises a polymeric material, and the flexible mold preferably comprises mold deformation prevention means, such as fibers, cloths, textiles, fabrics, and flexible screens. The preferred flexible mold comprises layers produced in accordance with the following steps:

a) applying a first layer of molding material to cover the surface of the original object;

b) allowing the first layer of molding material to substantially cure or solidify;

c) applying a second layer of molding material atop the first layer of cured or solidified molding material to form a bond between the first and second layers;

d) applying the mold deformation prevention means atop the second layer and allowing the mold deformation prevention means to settle in the second layer before the second layer cures or solidifies, thereby bonding the second layer to the mold deformation prevention means; and e) allowing the second layer comprising the mold deformation prevention means to cure or solidify.

The mold deformation prevention means may be substantially enclosed in the mold to prevent exposure of the mold deformation prevention means to the electrodeposition solution during electrodeposition, although the mold deformation prevention means may be disposed outside the mold.

Weighting means is preferably added to the mold; the weighting means prevents the flexible mold from floating in the electrodeposition bath. The weighting means preferably comprises materials such as metal shot or heavy metal or non-metal powders.

The mold may be positioned vertically in an electrodeposition bath, although it is preferably disposed horizontally in the electrodeposition bath with the object-facing surface of the mold facing upward and the anode disposed above the object-facing surface. A screen is preferably disposed between the anode and the mold.

Metal is electrodeposited onto the mold for a sufficient time to form a surface layer on the mold. Surface irregularities may be formed on the mold.

Backing material may be affixed to the backing surface of the metal deposit before detaching the metal deposit from the mold in step i). The backing material preferably comprises a polymeric material. Additives, such as anti-oxidants, surfactants, and chemical buffers, may be disposed in the backing material. The backing material may further comprise strengthening means, such as powders, particles, droplets, ions, fibers, cloths, fabrics, textiles, screens, and sheets, for providing structural stability to the metal deposit and backing material. The backing material may further comprise mounting means for attaching the electrodeposited metal product to an object or surface.

The mold-facing surface of the electrodeposited metal product obtained in step i) may be further treated by polishing, brightening, grinding, brushing, chemical oxidation, and/or corrosion protection.

The process of the invention is also useful for electrodeposition of metals on molds which have been made for other processes, such as casting processes. The invention is particularly useful for producing artworks.

The invention includes products made in accordance with the above process, and products which utilize the "reverse" surface (as compared to prior art products) as the finish surface. These products comprise a backing surface and a visual surface. The visual surface is substantially similar to the surface of an object being essentially duplicated by the metal electrodeposition product. The visual surface comprises a first electrodeposited layer and the backing surface comprising a last electrodeposited layer, the first electrodeposited layer being the first layer deposited on the metal electrodeposition product during an electrodeposition process to produce the metal electrodeposition product, and the last electrodeposited layer being the last layer deposited on the metal electrodeposition product during the electrodeposition process.

Accordingly, it is a primary object of the present invention to provide an inexpensive and easy electrodeposition process for producing metal duplicates of objects and, in particular, artworks.

It is another object of the present invention to provide a process for producing a product which has greater detail than a metal casting.

Yet another object of the present invention is to provide a flexible mold which will not deform in an electroplating bath.

Still another object of the present invention is to provide a process for electrodeposition of a mold in a horizontal position in the electrodeposition bath.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the appended claims.

DESCRIPTION OF THE PREFERRED EMBODIMENTS OF THE INVENTION

This invention relates to an electrodeposition process for producing a metal electrodeposition product which essentially duplicates the surface configuration of an object. In the preferred embodiment, the process for making a mold from an original object and electrodeposition of the mold comprises the following steps:

a) obtaining an original solid object comprising a surface configuration which is to be essentially duplicated by the electrodeposition process;

b) applying a flexible molding material to the surface of the original object;

c) allowing the flexible molding material to cure or solidify to obtain a solid flexible mold comprising an object-facing surface configuration which is in a reverse configuration to the surface of the object, the flexible mold being essentially non-reactive to an electrodeposition solution;

d) removing the flexible mold from the surface of the original object;

e) providing conductive means to the object-facing surface of the mold;

f) placing the mold comprising the conductive means into an electrodeposition bath, the electrodeposition bath comprising the electrodeposition solution and at least one anode;

g) electrodepositing metal onto the object-facing surface of the mold for a sufficient time to form a metal deposit on the object-facing surface of the mold;

h) removing the mold from the electrodeposition bath; and i) detaching the mold from the metal deposit to produce an electrodeposited metal product comprising a mold-facing surface and a backing surface, the mold-facing surface having a substantially similar configuration to the surface of the original object.

The original object may be of any solid material, such as clay, wax, metal, wood, ceramic, or plaster. The surface configuration of the original object can be essentially duplicated by the process of the present invention. In the preferred embodiment, the original object is an artwork, such as made of clay, wax, wood, ceramic or plaster. The process of the present invention is useful for making multiple or duplicate metal electrodeposited artworks by molding the original object and then electrodepositing a metal onto the mold. The mold may be used more than once and preferably hundreds of times for producing multiple products.

In the preferred embodiment, the flexible molding material is applied directly to the original object to obtain a mold of the original object. The preferred flexible molding material is a polymeric material, such as silicone or rubber-like material. These materials should be resistant to typical electrodeposition solutions and thus will not be destroyed or degrade in the electrodeposition bath. The molding materials may be in liquid, paste, or other form, which solidifies or cures to a solid flexible material. A mold release material may be applied to the original object prior to applying the flexible molding material to assist in removing the mold from the original object after the molding material has cured or solidified. Similarly, a stabilizing material, such as lacquer, may be applied to the original object so that the original object is not destroyed during the molding process, for instance when clay is utilized.

A flexible mold is essential to the invention, in order to remove the mold from the original object, and to later remove the mold from the metal which is electrodeposited thereon. The term "flexible" as used throughout the specification and claim means a material which can be easily "peeled" off or removed from the object and metal deposit.

Because the mold is flexible, it is preferable for the mold to have internal or external mold deformation prevention means, to prevent the mold from stretching or deforming during electrodeposition. The internal mold deformation prevention means preferably comprises fibers, cloth, textiles, fabrics, or flexible screens, which prevent the mold from stretching and deforming, yet retain the flexibility of the mold. The preferred internal mold deformation prevention means is fiberglass cloth, which can be easily laid across the molding material while the mold is being made. As stated above, loose fibers, other types of cloths, fabrics, textiles, or screens, such as thin plastic screens, may be utilized in accordance with the invention. External mold deformation prevention means, such as rigid supports, may also be utilized in accordance with the invention.

The preferred mold of the invention is a multilayer mold, produced in accordance with the following steps:

a) applying a first layer of molding material to cover the surface of the original object;

b) allowing the first layer of molding material to substantially cure or solidify;

c) applying a second layer of molding material atop the first layer of cured or solidified molding material to form a bond between the first and second layers;

d) applying mold deformation prevention means, such as fiberglass, and preferably weighting means, such as metal shot or heavy metal or non-metal powder, atop the second layer and allowing the mold deformation prevention means and weighting means to settle in the second layer before the second layer cures or solidifies, thereby bonding the second layer to the mold deformation prevention means and weighting means; and e) allowing the second layer comprising the mold deformation prevention means and weighting means to cure or solidify.

Preferably, the mold deformation prevention means and weighting means are substantially enclosed in the second layer to prevent exposure of the mold deformation prevention means and weighting means to the electrodeposition solution during electrodeposition. This is particularly important if the mold deformation prevention means or weighting means would react, be degraded or destroyed during electrodeposition. However, the mold deformation prevention means may be disposed outside the mold, such as a metal support, to hold the mold in position.

The preferred weighting means is metal shot or heavy metal or non-metal powder, such as lead shot or olivine, which will prevent the mold from floating in the electrodeposition bath. Other weighting means, such as affixing the mold in position in the electrodeposition bath or utilizing other "sinking-type" materials in the mold itself, may also be provided in accordance with the invention, and the term "weighting means" is intended to cover such variations.

Existing flexible molds, such as used in making cast metal artworks, may also be utilized in the electrodeposition process of the invention (steps 3) through i) set forth above). However, these molds will not have the mold deformation prevention means or weighting means.

In the preferred embodiment, the solidified or cured mold is coated with a conductive coating. Prior to applying this coating, the mold may be washed or scrubbed to remove any residual material resulting from the molding process, such as mold release material, or material from the original object, such as clay. Any conductive coating, which is conductive to the electrodeposition solution and anodes present in the electrodeposition bath may be utilized in accordance with the invention. Useful conductive coating materials, such as silver, gold, graphite, nickel, copper, and alloys thereof, may be applied to the mold by means, common to the art, such as painting, spraying, and the like. Since the coating material will end up as the visual surface of the object, the coating material may be chosen for the purposes of retaining the coating as the visual surface. If it is desired to remove this coating surface from the final product, the coating material chosen should be economical and easy to apply and remove.

In an alternative embodiment, the mold material itself may comprise a conductive material. Similarly, the mold may comprise conductive particles which are disposed or embedded in the mold to achieve conductivity during electrodeposition. The phrase "providing conductive means" is intended to include conductive coatings as well as such variations.

The mold is then placed into an electrodeposition bath. The mold may be placed vertically into the bath, with the anode(s) positioned vertically and aside the mold. However, as discussed below, it is preferable to position the mold horizontally in the bath. Vertical positioning of the mold may cause more stretch or deformation of the mold, since the mold is flexible. Similarly, as electrodeposition gas by-products rise to the surface, these may affect the electrodeposition surface, such as causing lines on the surface. Thus, in the preferred embodiment, the mold is positioned horizontally in the electrodeposition bath, beneath the anode(s) to provide an initially uniform deposition surface. The mold can be placed on a flat surface, such as glass, which will not react with the electrodeposition solution, while helping prevent deformation of the mold. Another advantage to this horizontal placement is that, if desired, during the electrodeposition, "chunks," "needles," large crystals, or other random surface irregularities, may be formed as part of the metal deposit, partly due to the positioning of the anode directly above the mold. Similarly, particularly for artworks, added materials for visual, structural, electrical, or magnetic effects, such as fibers, may be allowed to gravitate downward in the electrodeposition bath and attach to the metal deposit; the term "surface irregularities" is intended to cover such embodiments. While the formation of surface irregularities is a highly undesirable effect in traditional electrodeposition processes because the final surface is the visual surface, these surface irregularities form the back surface of the product of the present invention, and assist in attaching backing material. Surface irregularities generally do not occur until after the first layer is formed on the mold. A screen may be placed between the anode(s) and the mold to eliminate or minimize the surface irregularities. Another advantage to horizontal placement of a mold in an electrodeposition bath is that one need not be concerned with overhead clearance for large molds, such as positioning these large molds in a vertical electrodeposition bath.

The electrodeposition may cover the entire surface of the mold so that the final visual surface is solid metal, or if desired, such as with artworks, "holes" or open spaces may be left by incomplete electroplating for an open effect or to be filled in by backing. The electrodeposition may comprise a "smooth" metal deposit, or may comprise surface irregularities, as discussed above.

All metals capable of being plated onto a substrate in the prior art may be used in the process of the invention. These metals include, but are not limited to copper, silver, gold, chrome, nickel, aluminum, iron, and alloys thereof. In fact, most metals are capable of being electrodeposited. Electrodeposition solutions and anode materials known in the art for typical plating operations may also be used in accordance with the invention.

After the electrodeposition is completed, the mold containing the metal electrodeposit is removed from the electrodeposition bath. Preferably, the metal deposit is washed immediately to remove the electrodeposition solution (generally acids). The wash solution may be water or a neutralizing solution, such as an ammonia-based solution. Preferably, the metal deposit is dried, particularly if a backing is to be placed on the deposit.

If no backing material is desired, then the metal deposit may be separated from the mold. It is preferable, however, to back the backing surface of the metal deposit with a backing material, to provide added stability to the metal deposit. Also, with a backing material, one can form a thinner metal deposit. If a backing material is utilized, it should be affixed to the metal deposit before separating the metal deposit from the mold. The preferred backing material is a polymeric material, such as epoxy. Additives, such as anti-oxidants (to prevent oxidation or corrosion of the metal), surfactants (to assist in penetration of the backing material into the metal porosity), and chemical buffers (to neutralize or chemically deactivate the surface of the metal) may be added to the backing material, preferably on or near the metal deposit.

As with the preferred mold of the invention, a strengthening material may be added to the backing material, to provide additional structural stability. The preferred strengthening materials are fibers, cloths (e.g. fiberglass cloth), fabrics, textiles, screens, sheets (e.g. metal or plastic sheets), and metal or ceramic particles, droplets, ions, or powders (such as plasma or flame sprayed metals or ceramics, or chemical vapor deposited metals). If the electrodeposition product is to be placed outdoors or in an area with high temperature changes, the backing and strengthening materials should be chosen to have a similar coefficient of expansion and contraction to the metal deposit.

If the electrodeposition product is to be mounted, such as an artwork on the wall, mounting means may be placed in the backing material, before it cures or solidifies, for attaching the product to an object (e.g. a frame) or surface (e.g. a wall or pedestal). Mounting means may comprise strips, hooks, or the like.

After the backing material has solidified, the metal deposit is separated from the mold to produce the electrodeposition product. The "final" or desired surface is the electrodeposition surface which deposited first on the mold, or the mold-facing surface. This surface may have the coating which was applied to the mold. The coating may be a desired final surface material, such as when silver is utilized as the coating material. Or, the coating may be removed by brushing, grinding, or chemically treating the surface, in whole or in part. The surface may also be treated by other means, common to the art, such as polishing, brightening, chemical oxidation (patinae), and corrosion protection (e.g. a clear polymeric coating, such as "Incralac," which binds to metals such as copper, distributed by Conservation Ltd. in Sparks, Nev.). The edges of the metal deposit may be polished, cut or ground to a desired shape or finish.

The electrodeposition product of the invention duplicates the original object more exactly and with more detail than for instance, a metal casting process or traditional electrodeposition process, because of the nature of electrodeposition and the unique "reverse" process of the present invention. The product of the present invention utilizes the first layer of electrodeposition as the final visual surface as opposed to the last layer of electrodeposition as with prior art processes. The metal ions which form the first layer deposit almost exactly into the mold, thereby providing a high detail product. These metal ions are not limited in their deposition on the mold, such as with metal casting which limits deposition due to viscosity of the molten metal, or with traditional electrodeposition processes in which the last ions deposited have limited positioning due to the process itself.

The invention is further illustrated by the following non-limiting example.

EXAMPLE

Fairly flat textile materials (ranging from watercolor paper and a silk ribbon having a very fine weave to fiberglass cloth having a coarse weave) and bas-relief artworks, including a stepped wood-block bas-relief (having 90 degree angles) were molded. RTV silicone was used as the molding material. On one of the artworks, a first layer (approximately ½) of silicone was placed on the objects and allowed to cure. A second layer of silicone (approximately ¼) was placed on the first layer. Before the second layer was cured, fiberglass cloth was placed onto the second layer and worked down into the second layer. Lead shot was sprinkled onto the second layer at a spacing of approximately 1/16" to ¼and allowed to settle. Additional silicone was added to cover the shot before the second layer cured. After curing, the mold was removed from the objects and coated with a silver or graphite conductive coating. The molds were placed into a horizontal electrodeposition bath, containing a typical copper sulfate/sulfuric acid electroplating solution useful for plating copper. The molds were disposed horizontally in the bath, on a glass sheet, with anodes positioned above the molds and a fiberglass screen positioned between the mold and the anodes. Copper metal was electrodeposited at a voltage of between 0.6 and 0.8 volts onto the molds for approximately 1 to 3 days to form a copper thickness of approximately 1/16" to 1/32". The molds were removed from the bath, washed and dried. The molds were then backed with an epoxy fiberglass composite material. Additives, including chemical buffers, anti-oxidants, and surfactants, were added to the backing material. Fiberglass cloth was also added to the backing material to strengthen the product. After the backing material cured, the metal deposit was removed from the mold. The resulting products were then brushed with a metal, polished, patinaed, and coated with Incralac. The reproduced cloth fibers of the original textiles, even the very fine individual fibers, could be seen in the resulting products. The process was found to be useful for flat, as well as bas-relief objects.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A process for electrodepositing a metal on a mold comprising the following steps:

(a) obtaining an original solid object comprising a surface configuration which is to be essentially duplicated by the electrodeposition process;

(b) applying an elastic molding material to the surface of the original object;

(c) allowing the elastic molding material to cure or solidify to obtain a solid elastic mold comprising an object-facing surface configuration which is in a reverse configuration to the surface configuration of the object, the elastic mold being essentially non-reactive to an electrodeposition solution;

(d) removing the elastic mold from the surface of the original object;

(e) providing conductive means to the object-facing surface of the mold;

(f) placing the mold comprising the conductive means into an electrodeposition bath, the electrodeposition bath comprising the electrodeposition solution and at least one anode;

(g) providing weighting means to the elastic mold for preventing the elastic mold from floating in the electrodeposition bath;

(h) electrodepositing metal onto the object-facing surface of the mold for a sufficient time to form a metal deposit on the object-facing surface of the mold;

(i) removing the mold from the electrodeposition bath; and (j) detaching the elastic mold from the metal deposit to produce an electrodeposited metal product comprising a mold-facing surface and a back surface, the mold-facing surface having a substantially similar configuration to the surface configuration of the original object.

2. The process of claim 1 wherein the elastic molding material comprises a polymeric material.

3. The process of claim 1 wherein the mold is disposed horizontally in the electrodeposition bath with the object-facing surface of the mold facing upward and the anode disposed above the object-facing surface.

4. The process of claim 3 wherein a screen is disposed between the anode and the mold.

5. The process of claim 1 wherein in step (h), metal is electrodeposited onto the mold for a sufficient time to form surface irregularities.

6. The process of claim 1 wherein backing material is affixed to the back surface of the metal deposit before detaching the metal deposit from the mold in step (j).

7. The process of claim 6 wherein the backing material comprises a polymeric material.

8. The process of claim 6 wherein at least one additive selected from the group consisting of anti-oxidants, surfactants, and chemical buffers, is disposed in the backing material.

9. The process of claim 6 wherein the backing material comprises strengthening means for providing structural stability to the metal deposit and backing material.

10. The process of claim 9 wherein the strengthening means comprises at least one member selected from the group consisting of powders, ions, particles, droplets, fibers, cloths, fabrics, textiles, screens, and sheets.

11. The process of claim 6 wherein the backing material comprises mounting means for attaching the electrodeposited metal product to an object or surface.

12. The process of claim 1 wherein the mold-facing surface of the electrodeposited metal product obtained in step (i) is treated by at least one process selected from the group consisting of polishing, brightening, grinding, brushing, chemical oxidation, and corrosion protection.

13. The process of claim 1 useful for producing artwork.

14. The process of claim 1 wherein the weighting means comprises at least one member selected from the group consisting of shot and heavy powders.

15. A process for electrodepositing a metal on a mold comprising the following steps:

(a) obtaining an original solid object comprising a surface configuration which is to be essentially duplicated by the electrodeposition process;

(b) applying an elastic molding material to the surface of the original object and providing mold deformation prevention means to the elastic mold by:

(i) applying a first layer of molding material to cover the surface of the original object;

(ii) allowing the first layer of molding material to substantially cure or solidify;

(iii) applying a second layer of molding material atop the first layer of cured or solidified molding material to form a bond between the first and second layers;

(iv) applying the molding deformation prevention means atop the second layer and allowing the mold deformation prevention means to settle in the second layer before the second layer cures or solidifies, thereby bonding the second layer to the mold deformation prevention means; and (v) allowing the second layer comprising the mold deformation prevention means to cure or solidify.

(c) allowing the elastic molding material to cure or solidify to obtain a solid elastic mold comprising an object-facing surface configuration which is in a reverse configuration to the surface configuration of the object, the elastic mold being essentially non-reactive to an electrodeposition solution;

(d) removing the elastic mold from the surface of the original object;

(e) providing conductive means to the object-facing surface of the mold;

(f) placing the mold comprising the conductive means into an electrodeposition bath, the electrodeposition bath comprising the electrodeposition solution and at least one anode;

(g) electrodepositing metal onto the object-facing surface of the mold for a sufficient time to form a metal deposit on the object-facing surface of the mold;

(h) removing the mold from the electrodeposition bath; and (i) detaching the elastic mold from the metal deposit to produce an electrodeposited metal product comprising a mold-facing surface and a back surface, the mold-facing surface having a substantially similar configuration to the surface configuration of the original object.

16. The process of claim 15 wherein the mold deformation prevention means comprises at least one member selected from the group consisting of fibers, cloths, textiles, fabrics, and flexible screens.

17. The process of claim 15 wherein the mold deformation prevention means is substantially enclosed in the second layer to prevent exposure of the mold deformation prevention means to the electrodeposition solution during electrodeposition.

18. The process of claim 15 wherein in step (b)(iv), weighting means is added to the second layer before the second layer cures or solidifies, whereby the weighting means prevents the elastic mold from floating in the electrodeposition bath.

*19. The process of claim 1 wherein the mold is disposed vertically in the electrodeposition bath.*

*20. The process of claim 5 wherein the surface irregularities provide at least one effect selected from the group consisting of electrical effects, magnetic effects and structural effects.*

*21. The process of claim 5 wherein the surface irregularities comprise at least one structural member selected from*

*the group consisting of powders, particles, droplets fibers, cloths, fabrics, textiles, screens and sheets.*

*22. The process of claim 1 wherein the weighting means comprises affixing the mold in position in the electrodeposition bath.*

*23. The process of claim 1 further comprising mold deformation prevention means for preventing deformation of the elastic mold in the electrodeposition bath.*

*24. The process of claim 1 wherein the conductive means comprises conductive means disposed within the mold.*

*25. The process of claim 24 wherein the conductive means disposed within the mold comprises conductive particles.*

*26. The process of claim 1 wherein the conductive means comprises a conductive deposit applied to the mold.*

*27. A process for electrodepositing a metal on a mold comprising the following steps:*

*(a) obtaining an original solid object comprising a surface configuration which is to be essentially duplicated by the electrodeposition process;*

*(b) applying an elastic molding material to the surface of the original object;*

*(c) allowing the elastic molding material to cure or solidify to obtain a solid elastic mold comprising an object-facing surface configuration which is in a reverse configuration to the surface configuration of the object;*

*(d) removing the elastic mold from the surface of the original object;*

*(e) providing conductive means to the object-facing surface of the mold;*

*(f) placing the mold comprising the conductive means into an electrodeposition bath, the electrodeposition bath comprising the electrodeposition solution and at least one anode;*

*(g) providing mold floating prevention means to prevent the elastic mold from floating in the electrodepositon bath;*

*(h) electrodepositing metal onto the object-facing surface of the mold for a sufficient time to form a metal deposit on the object-facing surface of the mold;*

*(i) removing the mold from the electrodeposition bath; and*

*(j) detaching the elastic mold from the metal deposit to produce an electrodeposited metal product comprising a mold-facing surface and a back surface, the mold-facing surface having a substantially similar configuration to the surface configuration of the original object.*

*28. The process of claim 27 wherein metal is electrodeposited onto the mold for a sufficient time to form surface irregularities.*

*29. The process of claim 28 wherein the surface irregularities provide at least one effect selected from the group consisting of electrical effects, magnetic effects and structural effects.*

*30. The process of claim 27 wherein the surface irregularities comprise at least one structural member selected from the group consisting of powders, particles, droplets, fibers, cloths, fabrics, textiles, screens and sheets.*

*31. The process of claim 27 further comprising mold deformation prevention means for preventing deformation of the elastic mold in the electrodeposition bath.*

*32. The process of claim 27 wherein the conductive means comprises conductive means disposed within the mold.*

*33. The process of claim 32 wherein the conductive means disposed within the mold comprises conductive particles.*

*34. The process of claim 27 wherein the conductive means comprises a conductive deposit applied to the mold.*

*35. The process of claim 27 wherein the mold floating prevention means comprises means disposed within the mold.*

*36. The process of claim 27 wherein the mold floating prevention means comprises weighting means.*

*37. The process of claim 27 wherein the mold floating prevention means comprises affixing the mold in position in the electrodeposition bath.*

*38. A process for electrodepositing a metal on a mold comprising the following steps:*

*(a) obtaining an original solid object comprising a surface configuration which is to be essentially duplicated by the electrodeposition process;*

*(b) applying an elastic molding material to the surface of the original object;*

*(c) allowing the elastic molding material to cure or solidify to obtain a solid elastic mold comprising an object-facing surface configuration which is in a reverse configuration to the surface configuration of the object;*

*(d) removing the elastic mold from the surface of the original object;*

*(e) providing conductive means to the object-facing surface of the mold;*

*(f) placing the mold comprising the conductive means into an electrodeposition bath, the electrodeposition bath comprising the electrodeposition solution and at least one anode;*

*(g) providing mold deformation prevention means for preventing deformation of the elastic mold while in the electrodeposition bath;*

*(h) electrodepositing metal onto the object-facing surface of the mold for a sufficient time to form a metal deposit on the object-facing surface of the mold;*

*(i) removing the mold from the electrodeposition bath, and*

*(j) detaching the elastic mold from the metal deposit to produce an electrodeposited metal product comprising a mold-facing surface and a back surface, the mold-facing surface having a substantially similar configuration to the surface configuration of the original object.*

*39. The process of claim 38 wherein metal is electrodeposited onto the mold for a sufficient time to form surface irregularities.*

*40. The process of claim 39 wherein the surface irregularities provide at least one effect selected from the group consisting of electrical effects, magnetic effects and structural effects.*

*41. The process of claim 39 wherein the surface irregularities comprise at least one structural member selected from the group consisting of powders, particles, droplets, fibers, cloths, fabrics, textiles, screens and sheets.*

*42. The process of claim 38 wherein the mold deformation prevention means is disposed within the mold.*

*43. The process of claim 38 wherein the mold deformation prevention means is disposed outside the mold.*

*44. The process of claim 38 wherein the mold deformation prevention means comprises a rigid support.*

*45. The process of claim 38 wherein the mold deformation prevention means comprises at least one material selected from the group consisting of fibers, cloths, textiles, fabrics, and screens.*

*46. The process of claim 38 wherein the conductive means comprises conductive means disposed within the mold.*

*47. The process of claim 46 wherein the conductive means disposed within the mold comprises conductive particles.*

*48. The process of claim 38 wherein the conductive means comprises a conductive deposit applied to the mold.*

*49. A process for electrodepositing and forming a composite material on a mold comprising the following steps:*

*(a) providing a mold for electrodeposition thereon;*

*(b) providing conductive means to the mold;*

*(c) placing the mold comprising the conductive means horizontally into an electrodeposition bath, the electrodeposition bath comprising the electrodeposition solution and at least one anode;*

*(d) electrodepositing metal onto the mold;*

*(e) providing by vertical gravitation downward onto the horizontally disposed mold at least one structural material selected from the group consisting of powders, particles, droplets, fibers, cloths, fabrics, textiles, and screens to the electrodeposited metal to form a metal composite.*

*50. The process of claim 49 wherein the mold comprises an elastic material.*

*51. The process of claim 49 wherein the metal composite deposit provides at least one effect selected from the group consisting of electrical effects and magnetic effects.*

*52. The process of claim 49 further comprising mold floating prevention means for preventing the mold from floating in the electrodeposition bath.*

*53. A process for electrodepositing a metal on a mold comprising the following steps:*

*(a) obtaining an original solid object comprising a surface configuration which is to be essentially duplicated by the electrodeposition process;*

*(b) applying an elastic molding material to the surface of the original object;*

*(c) allowing the elastic molding material to cure or solidify to obtain a solid elastic mold comprising an object-facing surface configuration which is in a reverse configuration to the surface configuration of the object, the elastic mold being essentially non-reactive to an electrodeposition solution;*

*(d) removing the elastic mold from the surface of the original object;*

*(e) providing conductive means to the object-facing surface of the mold;*

*(f) placing the mold comprising the conductive means horizontally into an electrodeposition bath, the electrodeposition bath comprising the electrodeposition solution and at least one anode;*

*(g) electrodepositing metal onto the object-facing surface of the mold for a sufficient time to form a metal deposit on the object-facing surface of the mold;*

*(h) removing the mold from the electrodeposition bath; and*

*(i) detaching the elastic mold from the metal deposit to produce an electrodeposited metal product comprising a mold-facing surface and a back surface, the mold-facing surface having an essentially exact configuration to the surface configuration of the original object.*

*54. A process for electrodepositing a metal on a mold comprising the following steps:*

*(a) obtaining an original solid object comprising a surface configuration which is to be essentially duplicated by the electrodeposition process;*

*(b) applying an elastic molding material to the surface of the original object;*

*(c) allowing the elastic molding material to cure or solidify to obtain a solid elastic mold comprising an object-facing surface configuration which is in a reverse configuration to the surface configuration of the object, the elastic mold being essentially non-reactive to an electrodeposition solution;*

*(d) removing the elastic mold from the surface of the original object;*

*(e) providing conductive means to the object-facing surface of the mold;*

*(f) placing the mold comprising the conductive means vertically into an electrodeposition bath, the electrodeposition bath comprising the electrodeposition solution and at least one anode;*

*(g) electrodepositing metal onto the object-facing surface of the mold for a sufficient time to form a metal deposit on the object-facing surface of the mold;*

*(h) removing the mold from the electrodeposition bath; and*

*(i) detaching the elastic mold from the metal deposit to produce an electrodeposited metal product comprising a mold-facing surface and a back surface, the mold-facing surface having an essentially exact configuration to the surface configuration of the original object.*

*55. A process for electrodepositing a metal on a mold comprising the following steps:*

*(a) obtaining an original solid object comprising a surface configuration which is to be essentially duplicated by the electrodeposition process;*

*(b) applying an elastic molding material to the surface of the original object;*

*(c) allowing the elastic molding material to cure or solidify to obtain a solid elastic mold comprising an object-facing surface configuration which is in a reverse configuration to the surface configuration of the object, the elastic mold being essentially non-reactive to an electrodeposition solution;*

*(d) removing the elastic mold from the surface of the original object;*

*(e) providing conductive means to the object-facing surface of the mold;*

*(f) placing the mold comprising the conductive means into an electrodeposition bath, the electrodeposition bath comprising the electrodeposition solution and at least one anode;*

*(g) electrodepositing metal onto the object-facing surface of the mold for a sufficient time to form a metal deposit and surface irregularities on the object-facing surface of the mold;*

*(h) removing the mold from the electrodeposition bath; and,*

*(i) detaching the elastic mold from the metal deposit to produce an electrodeposited metal product comprising a mold-facing surface and a back surface, the mold-facing surface having an essentially exact configuration to the surface configuration of the original object.*

*56. The process of claim 55 wherein the surface irregularities provide at least one effect selected from the group consisting of electrical effects, magnetic effects and structural effects.*

*57. The process of claim 55 wherein the surface irregularities comprise at least one structural member selected from the group consisting of powders, particles, droplets, fibers, cloths, fabrics, textiles, screens and sheets.*

*58. A process for electrodepositing a metal on a mold comprising the following steps:*

(a) *obtaining an original solid object comprising a surface configuration which is to be essentially duplicated by the electrodeposition process;*

(b) *applying an elastic molding material to the surface of the original object;*

(c) *allowing the elastic molding material to cure or solidify to obtain a solid elastic mold comprising an object-facing surface configuration which is in a reverse configuration to the surface configuration of the object, the elastic mold being essentially non-reactive to an electrodeposition solution;*

(d) *removing the elastic mold from the surface of the original object;*

(e) *providing conductive means disposed within the mold to the object-facing surface of the mold;*

(f) *placing the mold comprising the conductive means into an electrodeposition bath, the electrodeposition bath comprising the electrodeposition solution and at least one anode;*

(g) *electrodepositing metal onto the object-facing surface of the mold for a sufficient time to form a metal deposit on the object-facing surface of the mold;*

(h) *removing the mold from the electrodeposition bath; and*

(i) *detaching the elastic mold from the metal deposit to produce an electrodeposited metal product comprising a mold-facing surface and a back surface, the mold-facing surface having an essentially exact configuration to the surface configuration of the original object.*

*59. The process of claim 58 wherein the conductive means disposed within the mold comprises conductive particles.*

*60. A process for electrodepositing a metal on a mold comprising the following steps:*

(a) *obtaining an original solid object comprising a surface configuration which is to be essentially duplicated by the electrodeposition process;*

(b) *applying an elastic molding material to the surface of the original object;*

(c) *allowing the elastic molding material to cure or solidify to obtain a solid elastic mold comprising an object-facing surface configuration which is in a reverse configuration to the surface configuration of the object, the elastic mold being essentially non-reactive to an electrodeposition solution;*

(d) *removing the elastic mold from the surface of the original object;*

(e) *providing conductive means to the object-facing surface of the mold, the conductive means comprising a conductive deposit applied to the mold;*

(f) *placing the mold comprising the conductive means into an electrodeposition bath, the electrodeposition bath comprising the electrodeposition solution and at least one anode;*

(g) *electrodepositing metal onto the object-facing surface of the mold for a sufficient time to form a metal deposit on the object-facing surface of the mold;*

(h) *removing the mold from the electrodeposition bath; and*

(i) *detaching the elastic mold from the metal deposit to produce an electrodeposited metal product comprising a mold-facing surface and a back surface, the mold-facing surface having an essentially exact configuration to the surface configuration of the original object.*

*61. A process for electrodepositing a metal on a mold comprising the following steps:*

(a) *obtaining an original solid object comprising a surface configuration which is to be essentially duplicated by the electrodeposition process;*

(b) *applying an elastic molding material to the surface of the original object;*

(c) *allowing the elastic molding material to cure or solidify to obtain a solid elastic mold comprising an object-facing surface configuration which is in a reverse configuration to the surface configuration of the object, the elastic mold being essentially non-reactive to an electrodeposition solution;*

(d) *removing the elastic mold from the surface of the original object;*

(e) *providing conductive means to the object-facing surface of the mold;*

(f) *providing mold floating prevention means for preventing the mold from floating in the electrodeposition bath;*

(g) *placing the mold comprising the conductive means into an electrodeposition bath, the electrodeposition bath comprising the electrodeposition solution and at least one anode;*

(h) *electrodepositing metal onto the object-facing surface of the mold for a sufficient time to form a metal deposit on the object-facing surface of the mold;*

(i) *removing the mold from the electrodeposition bath; and*

(j) *detaching the elastic mold from the metal deposit to produce an electrodeposited metal product comprising a mold-facing surface and a back surface, the mold-facing surface having an essentially exact configuration to the surface configuration of the original object.*

*62. The process of claim 61 wherein the mold floating prevention means comprises weighting means.*

* * * * *